United States Patent Office 3,549,399
Patented Dec. 22, 1970

3,549,399
ACCELERATOR TARGETS FOR
NEUTRON PRODUCTION
Marcel Guillaume, Grivegnee, Jean-Marie Peters, Leon Winand, Jean Govaerts, Georges Gueben, and Guy Delfiore, Liege, and Serge Godar, Brussels, Belgium, assignors to European Atomic Energy Community—Euratom, Brussels, Belgium
No Drawing. Filed June 13, 1966, Ser. No. 556,906
Claims priority, application Belgium, June 18, 1965, 14,317
Int. Cl. G21g 1/00
U.S. Cl. 117—16                                                6 Claims

ABSTRACT OF THE DISCLOSURE

A target for neutron-producing accelerators is prepared by coating a metal target blank with a polymer of a suitable deuterium or tritium containing momomer, preferably benzene, by pressure molding. If desired, the polymer, in powdered form, may be admixed with about 20% by weight of BeO powder and this mixture pressure molded onto the metal target base. Adhesion of the polymer to the metal base may be improved by precoating the metal with a conventional silver varnish.

---

The invention relates to a process for the production of targets for neutron-producing accelerators, and to the targets obtained with this process.

Mono-energetic neutrons can be obtained by bombarding deuterium or tritium-containing targets with appropriate ions. The nuclear reactions occurring in such reactions are (D,D) and (D,T) reactions.

$$H^2 + H^2 \rightarrow He^3 + n^1 + 3.28 \text{ mev.}$$

$$H^2 + H^3 \rightarrow He^4 + n^1 + 17.6 \text{ mev.}$$

Since these reactions are exoenergetic, relatively high neutron fluxes can be obtained using relatively low acceleration voltages. For example 100 kev. deuterons are sufficient to produce an appreciable neutron flux.

To obtain the above-indicated nuclear reactions, in principle it is only necessary to bombard deuterium or tritium in the gaseous state in a closed chamber having very thin windows.

However, the latest practice in the prior art is to use targets which contain the gases absorbed in a thin coating of a suitable metal, e.g. zirconium or titanium, deposited on a support of another metal, e.g. copper, silver, gold, tungsten, platinum or tantalum. It is advantageous that the atomic ratio between the hydrogen isotope and the carrier metal should be as high as possible. The desirable features of such conventional targets are (1) negligible hydrogen loss of the target kept in a vacuum; (2) negligible isotope exchange between deuterium or tritium and surrounding hydrogen; (3) good bond between the absorbent metal and the carrier metal; (4) no unduly fast increase in the hydrogen equilibrium pressure at temperatures of up to 150° C.

The methods of preparing conventional targets which contain deuterium or tritium absorbed in a layer of zirconium or titanium melted or evaporated on the carrier metal could be improved as regards routine production.

Preparation methods require improvement particularly in the case of tritium targets, because of the harmful properties of this isotope and particularly because of the limited life of tritium targets under irradiation. Desirable target development is distinguished by maximum avoidance of any evolution of gas on prolonged storage increase of the atomic ratio between absorbed gas and absorbent material, and improvement of life under irradiation. The invention meets these requirements very satisfactorily.

The invention provides a process for the production of targets for neutron producing accelerators which comprises the catalytic polymerisation of polycondensation of a simple chemical compound or compounds containing deuterium and/or tritium and applying the resultant polymer or polycondensate to a support surface.

More specifically the process according to the invention is that a simple tritium and/or deuterium-containing chemical compound or compounds is, or are, polymerised or polycondensed by means of one or more catalysts to form a polymer or polycondensate and then the powder of the resulting marked polymer or polycondensate is pulverised, if desired in mixture with BeO or other materials having similar thermal, electric and nuclear characteristics to BeO, preferably in a proportion of 20% by weight, distributed uniformly, preferably by vibration screening in a mould on to a metal disc, preferably of stainless steel, which may or may not be coated with a material facilitating adhesion of the polyphenyl coating to the metal disc, and compressed, preferably at a pressure of about 4.5 tons (metric) per sq. cm. for example by means of a 20-tons (metric) press.

A preferred feature of the invention is that the polymerisation is carried out by means of a mixture of oxidant catalysts $AlCl_3$ and $CuCl_2$, preferably in an atomic ratio of 1:1.

Preferably the material facilitating adhesion of the marked polymer or polycondensate layer to the metal disc is a silver varnish.

According to another preferred feature of the invention, the polymer or polycondensate powder is distributed uniformly by means of a very fine screen consisting of 1350 wires per cm., preferably after prescreening through the same screen.

The simple chemical compounds may be benzene, toluene and xylene.

The simple chemical compounds for polycondensation may be tritium- and/or deuterium-containing benzimidazole.

One specific embodiment of the invention will be described hereinafter by way of example.

The reaction vessel used consisted of Pyrex glass with a capacity of 200 ml., consisting of three separate parts:

(a) the actual reaction space, which was of cylindrical shape with a flat bottom 600 mm. diameter;

(b) a wide ground neck for easy and rapid introduction of the catalytic mixture $AlCl_3$—$CuCl_2$;

(c) a ring-shaped space at the base of the neck with an exit to the outside through a small cock and access to the reaction space via a series of small apertures arranged in a circle.

The following procedure was carried out:

A tube with a cock was first placed above the reaction vessel. The interior of the vessel was evacuated through the small cock in the said ring.

The base of the vessel was immersed in liquid nitrogen and 1 ml. of tritium-containing benzene was supplied from a pipe via a tube with a "Springham" cock to cover the bottom surface with a solid film.

Atmospheric pressure was restored and the tube and cock were replaced by a funnel from which 11 g. of the equimolecular $AlCl_3$—$CuCl_2$ mixture was introduced in one operation.

The tube and cock were then substituted for the funnel again and the vacuum was restored.

The vessel was hermetically sealed by pressure held by springs under tension and brought to a temperature of 80° C. for half an hour in an oven. The apparatus was then cooled and the reaction gases are extracted through the "Springham" cock until degasification was as complete as possible. A little $CCl_4$ was introduced by sucking the same through the cock of the ring. The excess $AlCl_3$ dissolves. The tube fitted with the cock was then replaced by a tube fitted with a sintered glass disc and the system was inverted on a 2-litre vacuum Erlenmeyer flask.

Vacuum was established on the Erlenmeyer flask side and the washing solvents sucked through the ring cock and the small apertures were projected in streams on all these walls and entrained the reaction product on to the sintered glass. The $CuCl_2$ was eliminated in the same way by means of alcohol. After washing, the resulting polyphenyl was dried on the sintered glass in the oven.

This process was repeated eight times under the conditions indicated hereinbefore and gave the following results:

| Yields | Chlorine percent | Calcination residue percent |
|---|---|---|
| 111 | 15 | 1 |
| 118 | | |
| 114 | 23 | 1.5 |
| 119 | | |
| 109 | | |
| 112 | 14 | 1 |
| 118 | 22 | 1.5 |

It will be seen that some of the chlorine is bound during the reaction, but this is not harmful.

During the stages of the invention as indicated hereinbefore, the geometric factors of the vessel in which the reaction is carried out play a considerable part in the proper polymerisation sequence.

After drying of the tritium-containing polyphenyl, the powder was pulverised, mixed with 20% BeO to ensure better thermal conductivity of the pellet under irradiation, and then screened through a 1350 wires per cm. screen. The powder was then rescreened with a vibration screen and this time a metal disc coated with a thin layer of dried silver varnish fired at 750° C. was used to receive the polyphenyl. After the first layer of varnish had cooled, a second layer of the same material was applied. After drying the thus coated disc at ordinary temperature for 20-25 minutes, the polyphenyl mixture was applied to the coated disc and compressed under a static pressure of 4.5 tons (metric) per sq. cm. and partly penetrated into the varnish and secured thereby. The discs prepared in this way were heated in an oven at a programmed temperature of up to 500° C. The target was then complete and ready for use.

The targets obtained according to the invention have remarkable properties as regards storage and behaviour under ion bombardment. Thus under proton irradiation at 300 kv. 100μa. there was no thermal degradation, i.e., no hydrogen loss, during 15 hours of operation, provided that there was no hot spot or band at the target. With regard to the neutron yield of the targets obtained according to the invention, it exceeds the yield of conventional targets.

The state of the art offers numerous variations of the above example to enable the invention to be performed in other ways. Thus other Friedel-Crafts catalysts can be used for the polymerisation.

We claim:

1. A method for the preparation of neutron-producing targets comprising catalytically polymerizing a member of the group consisting of benzene, toluene, xylene and benzimidazole, in which at least part of the hydrogen is replaced by deuterium, tritium or mixtures thereof, pulverizing the resulting polymer, applying a layer of the powdered polymer to a metal base and compressing the layer under high pressure on said base.

2. A method according to claim 1 in which said member is benzene.

3. A method according to claim 1 in which the pressure is about 4.5 tons (metric) per sq. cm.

4. A method according to claim 1 in which the powdered polymer is admixed with powdered BeO in a 4:1 weight proportion and this mixture is applied as a layer to the base.

5. A method according to claim 4 in which said member is benzene and the layer of mixed polymer and BeO is compressed at a pressure of about 4.5 tons (metric) per sq. cm.

6. A target for neutron-producing accelerators produced by the process of claim 1.

References Cited

UNITED STATES PATENTS

| 2,993,851 | 7/1961 | Thomson et al. | 176—11X |
| 3,103,860 | 9/1963 | Piquette | 117—16X |
| 3,113,082 | 12/1963 | Imhoff et al. | 176—10X |
| 3,152,958 | 10/1964 | Allen | 176—10X |
| 3,228,292 | 1/1966 | Carlon et al. | 117—16 |
| 3,331,744 | 7/1967 | Taylor | 176—10 |

OTHER REFERENCES

Polymer Production in Radiolysis of Benzene, by W. M. Patrick and M. Burton, Jan. 4, 1954, pp. 2626–2629. Journal of American Chemical Society, vol. 76.

Atomics International: The Radiolysis of Deuterated B. Phenyls: Mechanism of Hydrogen Formation, by Burr et al., pp. 1–5, 7, 8 and 11–20, Aug. 1, 1959.

MURRAY KATZ, Primary Examiner

PAUL ATTAGUILE, Assistant Examiner

U.S. Cl. X.R.

117—33; 250—330; 260—931; 176—10, 11